United States Patent [19]

Maistre

[11] Patent Number: 4,470,238

[45] Date of Patent: Sep. 11, 1984

[54] NEW COMPOSITE STRUCTURE AND METHOD AND MATRIX FOR THE MAKING THEREOF

[75] Inventor: Michel Maistre, Bordeaux, France

[73] Assignee: Société Européenne de Propulsion, Puteaux, France

[21] Appl. No.: 342,403

[22] Filed: Jan. 25, 1982

[30] Foreign Application Priority Data

Jan. 29, 1981 [FR] France ................................ 81 01733

[51] Int. Cl.³ ............................................ E04H 12/00
[52] U.S. Cl. ........................................ 52/586; 52/648;
428/105; 405/284
[58] Field of Search ................. 52/585, 586, 605, 606,
52/607, 648; 405/30, 284; 428/105, 107, 108,
109

[56] References Cited

U.S. PATENT DOCUMENTS

| | | | |
|---|---|---|---|
| 640,473 | 1/1900 | Küpper | 52/585 |
| 956,632 | 5/1910 | Finch | 52/586 |
| 1,959,816 | 5/1934 | Crum | 52/606 |
| 3,165,750 | 1/1965 | Tell | 52/607 |
| 3,272,540 | 9/1966 | Glanzer | 52/648 |
| 4,350,728 | 9/1982 | Huang | 428/105 |
| 4,400,421 | 8/1983 | Stover | 428/105 |

FOREIGN PATENT DOCUMENTS

| | | | |
|---|---|---|---|
| 152959 | 12/1950 | Australia | 52/586 |
| 29193 | of 1912 | United Kingdom | 52/605 |

Primary Examiner—Henry E. Raduazo
Attorney, Agent, or Firm—Staas & Halsey

[57] ABSTRACT

The structure comprises a matrix formed by juxtaposing solid prefabricated matrix elements each provided with at least one cavity extending from one face to another face of the element, the matrix elements being arranged so that the cavities form continuous longitudinal housings, and reinforcing elements are inserted in the housings to form at least four bundles each constituted of spaced-apart reinforcing elements parallel to a same respective direction with the directions of the bundles being different fom each other and being such that, considering any plane of the space, at least two directions are not parallel to the plane, whereby a coherent composite structure is obtained without the need of binding material.

7 Claims, 17 Drawing Figures

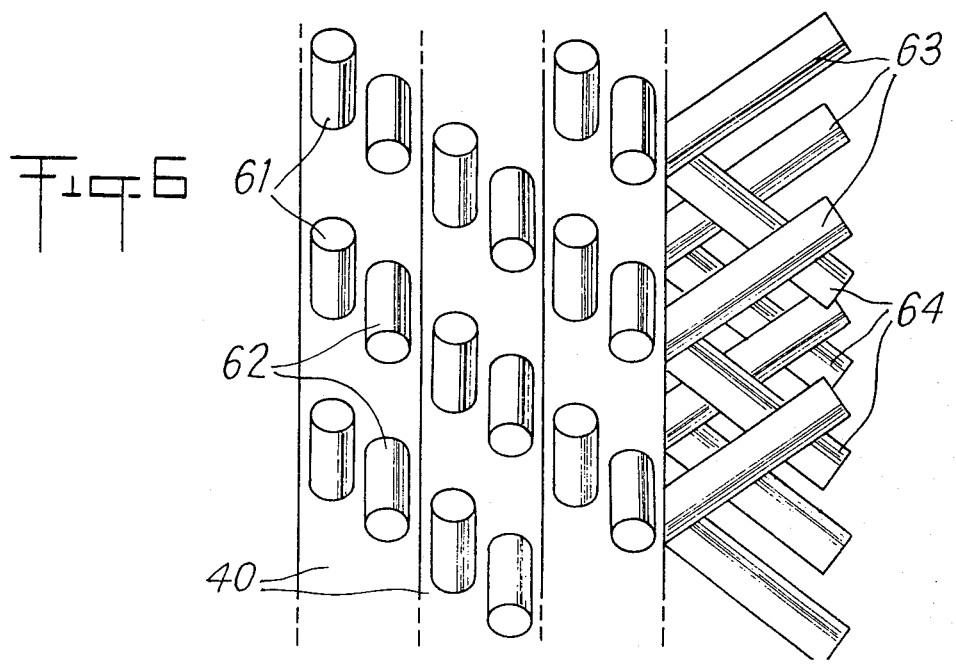
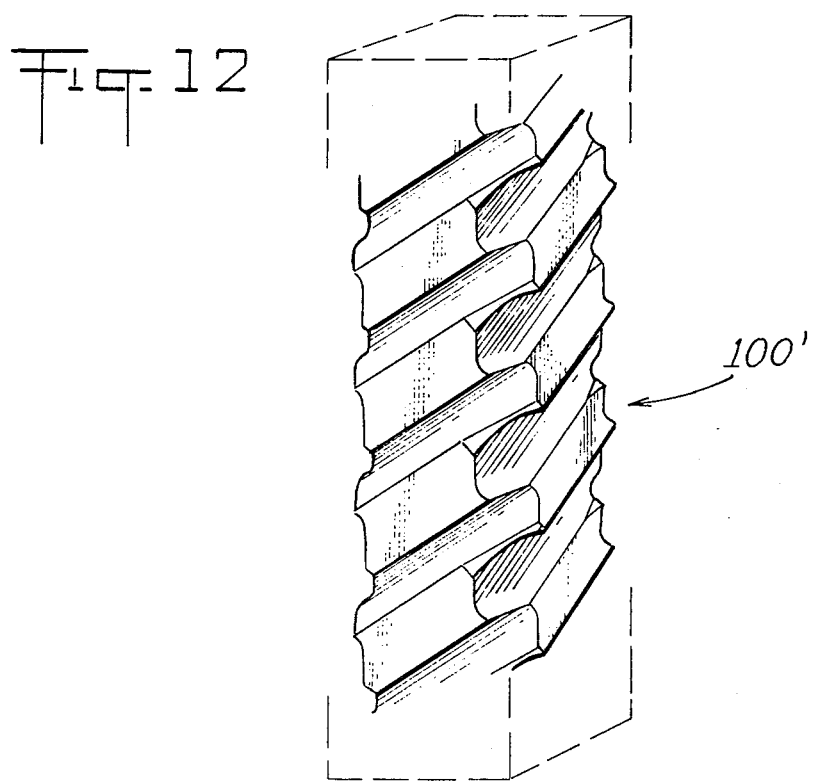

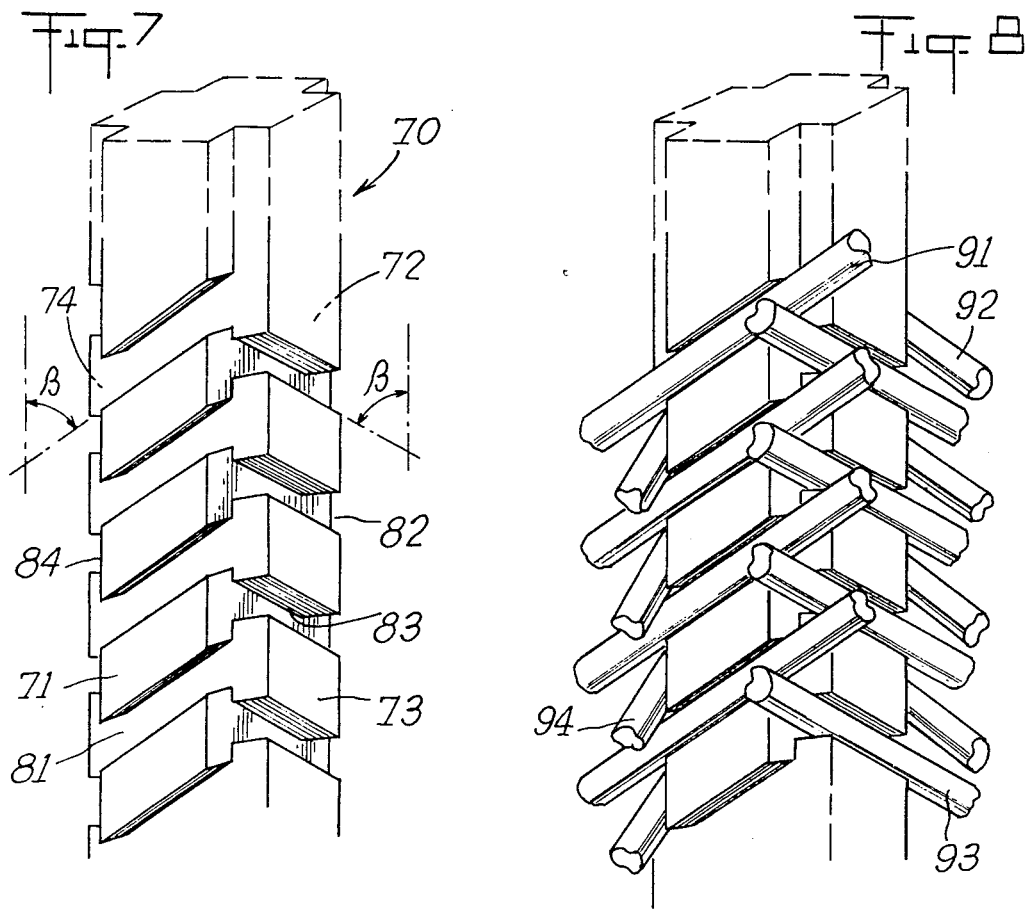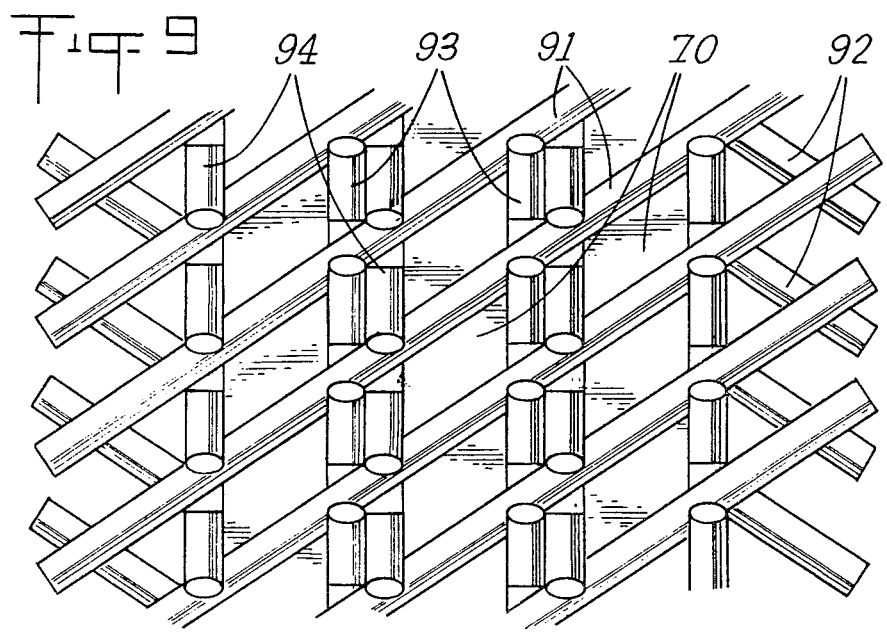

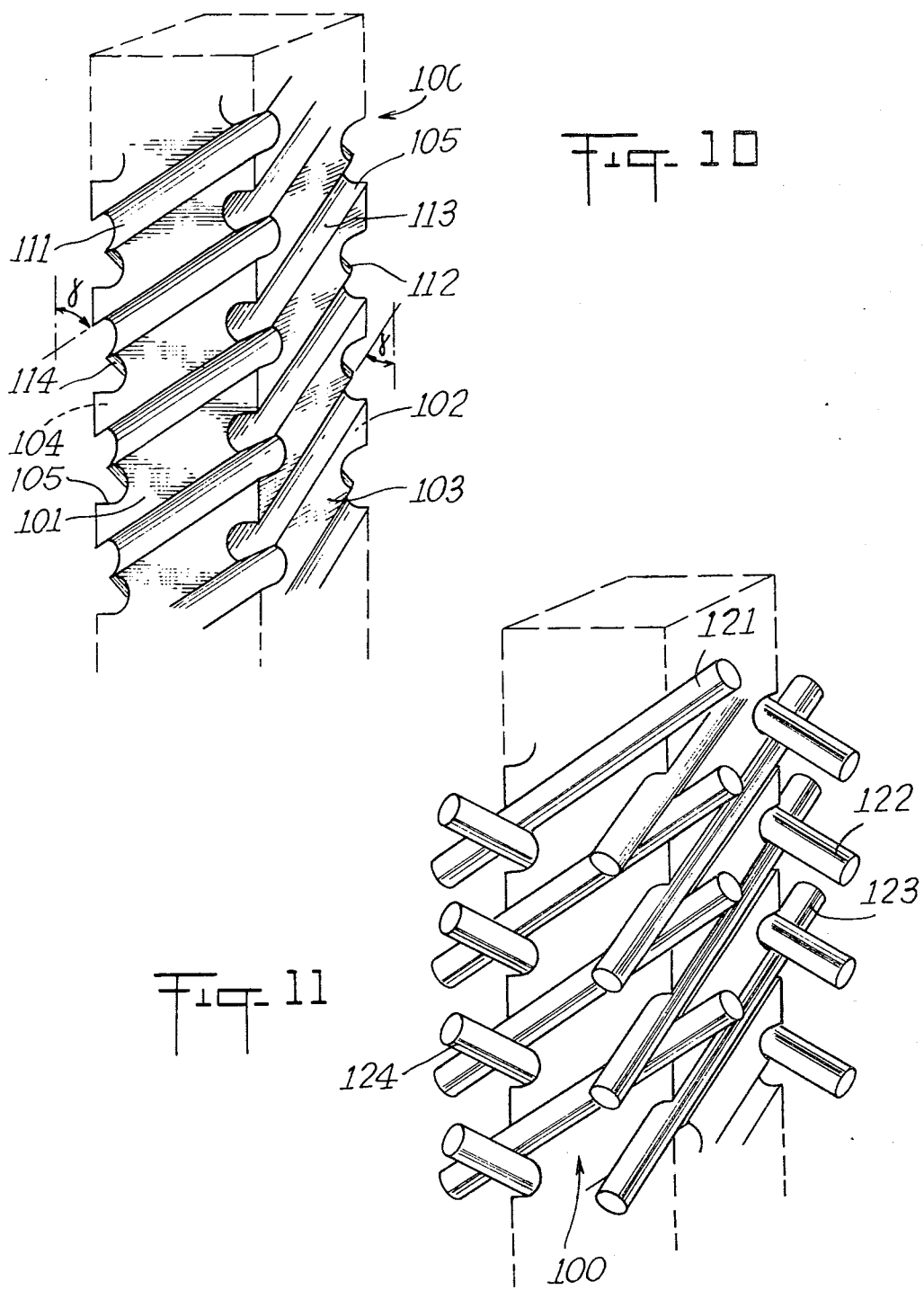

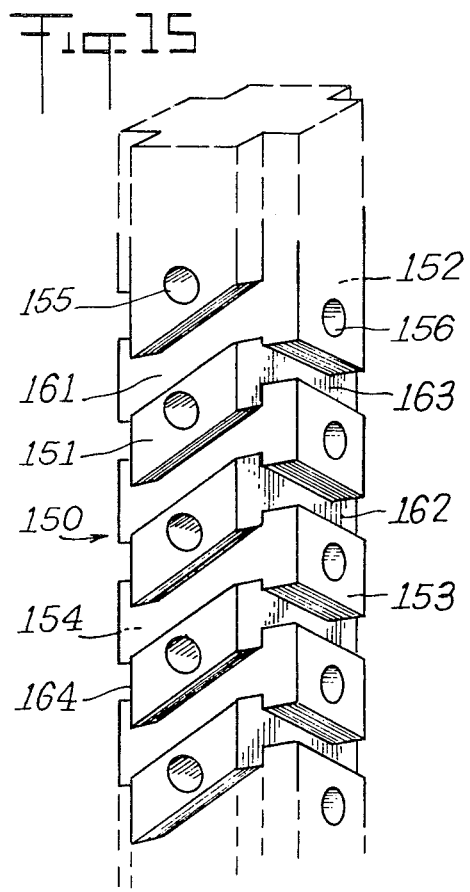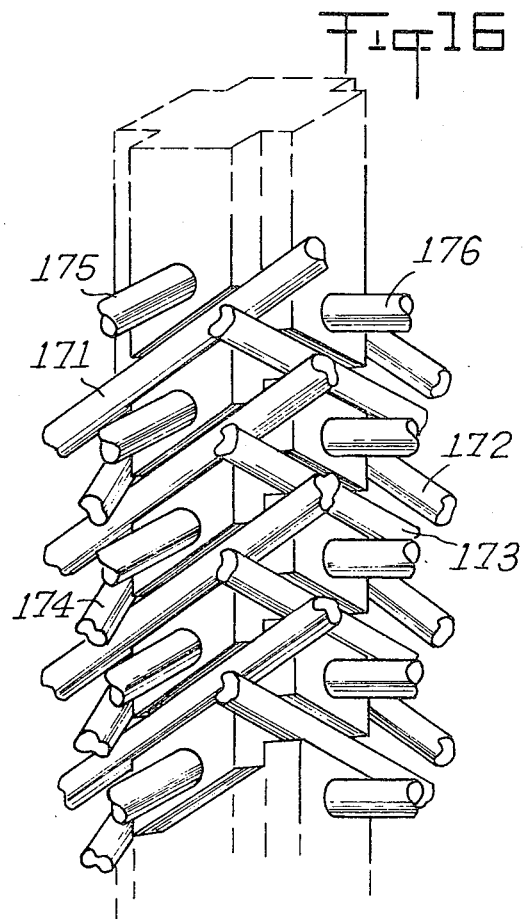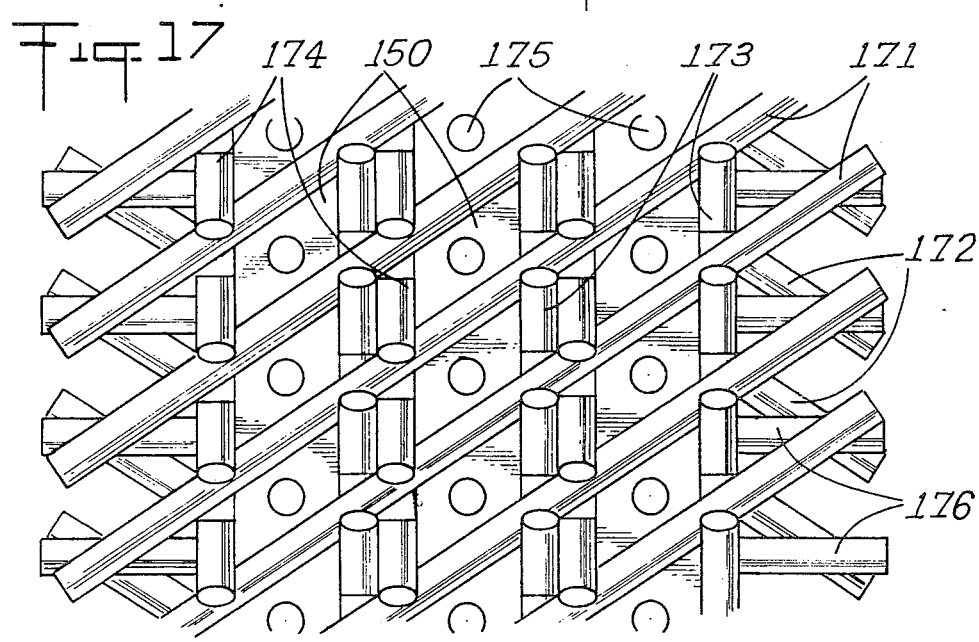

NEW COMPOSITE STRUCTURE AND METHOD AND MATRIX FOR THE MAKING THEREOF

The present invention relates to the construction of a composite structure of the type comprising: rectilinear reinforcing elements forming at least four different bundles, each bundle consisting of a plurality of reinforcing elements parallel to a particular direction and distributed in the whole volume of the structure, the direction of the different bundles not being parallel to each other and to a same plane, and a matrix filling at least part of the volume of the structure between the reinforcing elements.

Composite structures of this type are already known. They are especially used to produce parts which are required to withstand strong mechanical and thermal stresses, such as for example parts for rocket motor nozzles, the material constituting the reinforcing elements and the matrix being in this case mainly carbon.

Such known structures are described in French patent applications Nos. 2,276,916; 2,424,888 and 2,444,012. All three applications relate to reinforcing elements arranged in four or more bundles of different directions, to form a reinforcing structure which is then densified by introducing the material constituting the matrix in order to obtain the composite structure. It is therefore necessary for the reinforcing elements to be assembled together in space to obtain a reinforcement structure with enough cohesion to remain whole during subsequent phases of densification whilst sufficient access to all the voids between the reinforcing elements is preserved for the matrix. The formation of the matrix, or densification, is carried out by processes such as the chemical vapor deposition of the material of the matrix, or impregnation by a liquid or paste-like product which subsequently hardsets to form the matrix material. Hardsetting can, depending on the case, be obtained without particular treatment (such as for example with cement binding, or with room-temperature setting resins, or by solidification of a material introduced in the molten state) or it can be obtained by an appropriate thermal or physical treatment (such as hot-polymerization of hot-setting resins or cokefaction of resin or pitch by pyrolysis).

Before filling the voids between the reinforcing elements with a material introduced in the fluid state (gaseous, liquid, or paste), said voids can be partly filled with a solid material introduced in powder form.

These processes which are known to produce composite structures with multi-directional reinforcement, and consist in producing the matrix in situ from raw materials introduced in the fluid or powder state into the pre-assembled reinforcement structure, impose limitations in the choice of materials which can be used as the matrix and in the quality of the materials produced this way.

Also, in certain cases, and in particular in the case of carbon-carbon composites, the densification necessitates repeated performances of these processes during successive cycles and under special conditions of temperature and pressure. This makes the densification an expensive and lengthy process.

In order to facilitate the densification process, it has been proposed to realize a reinforcing texture by means of a method including the following steps: stacking sheets of unidirectional or bi-directional fibers, each sheet consisting of fibers bond together by a binding agent and being perforated; placing the sheets in the stack so that the perforations are aligned and that the fibers extend in the whole stack in at least two different directions; and placing rods or cores into the parallely extending channels formed by the aligned perforations. The reinforcing structure is then densified eventually after elimination of the binding agent. Such a method of making reinforcing textures is disclosed in French patent applications Nos. 2,398,705 and 2,433,003. This known method makes it possible to reduce the porosity of the reinforcing texture before starting the densification process and also to simplify and possibly to automatize the construction of this reinforcing structure. However, the whole matrix or nearly the whole matrix must still be deposited by means of usual densification processes. In addition, the bundle of parallel rods or cores placed into the aligned perforations cannot perform a locking of the stacked sheets, and appropriate means should then be used to maintain the stack during the densification process in order to prevent any de-cohesion of the stack.

It is the object of the present invention to overcome the limitations imposed by the already known processes and to propose a simple and instant method for manufacturing composite structures of the type defined hereinabove, which are advantageous, costwise and qualitywise.

This object is reached with a method including, according to the invention, the steps which comprise:

(a) providing solid, prefabricated matrix elements having a prismatic or parellelepipedic form and each provided with at least one cavity extending from one face to another face of the matrix element;

(b) juxtaposing said matrix elements in such a way that the cavities thereof extend one from the other and form rectilinear housings, the cavities being oriented so as to define at least four groups of rectilinear housings, each group consisting in a plurality of housings parallel to a same respective direction and distributed in the whole volume occupied by the juxtaposed matrix elements and the directions of said groups of housings being different from each other and such that, considering any plane of the space, at least two directions are not parallel to each other and to said plane; and (c) inserting thereafter said reinforcing elements in at least a part of the housings of each group, whereby a coherent composite structure is obtained with said reinforcing elements performing a locking of the assembled matrix elements.

Thus, according to one feature of the invention, the matrix is produced first, with prefabricated elements, before inserting the rectilinear reinforcing elements. It is therefore easier to obtain a homogeneous matrix without any of the long and expensive operations which are often necessary when building a composite structure by densifying a prefabricated multidirectional reinforcement structure.

The reinforcing elements act as pins or bolts which simultaneously ensure the positioning and assembly of the pre-juxtaposed matrix elements, which contributes to simplifying and speeding up the production of composite structures. Considering any plane of the structure, at least two bundles of reinforcing elements can be found which are not parallel to each other and to this plane. Therefore, the reinforcing elements perform a complete locking of the matrix elements, eliminating any risk of de-cohesion.

The composite structure made in accordance with the invention can in itself constitute a finished product, which can be used as is, in particular to produce objects or buildings which are coherent without bond and can, if need arises, be dismountable. By contrast with known building processes using stacked prefabricated blocks provided with grooves for vertical and horizontal metal rods forming a bidimensional reinforcement, the method according to the invention provides a tridimensional and at least quadri-directional reinforcement, which implies that the matrix elements are not only stacked but juxtaposed on all their faces (if they are pararellepipedic) or on all their lateral faces (if they are prismatic), and a coherent locked structure is obtained without the need of binding agent.

As a variant, and according to another feature of the method according to the invention, the composite structure can, once constructed, be subjected to a mechanical and/or thermal treatment designed to modify the compactness of the assembly or the properties of its constituents or their bondage, depending on the intended application. This subsequent treatment or compaction operation can take, for example, the form of a forging operation.

Yet another feature of the method according to the invention is that the composite structure can, if necessary, be completed, once constructed, by the addition of one or more constituents filling all or part of each void between the reinforcing elements and the matrix elements, and thus bonding them together. The composite material then obtained is more particularly suitable for applications where high mechanical and thermal stresses are expected (for example refractory composite materials used for making rocket motor nozzles) because they show high cohesion due to the presence of a multidirectional reinforcement structure closely bonded to a matrix. Said latter is then composed mainly by the matrix elements which are introduced, in the solid state, during the construction of the composite structure, and for the rest, by the material introduced after the said construction. Said material can only be introduced in the fluid or powder state, and by one of the known methods indicated hereinabove, i.e. the chemical vapor deposition process, or the impregnation with a liquid or pasty substance followed by a hard-setting treatment. It is to be noted that said known methods are then only used as a complement to a matrix constituted of juxtaposed solid materials, and are not necessary to achieve the cohesion of the structure according to the invention.

Advantageously, the matrix elements are all identical. They can for example be composed of parallelepipedal blocks or prismatic bars. Matrix elements can be densely assembled, leaving in this case no free space between them, except for the voids formed by the cavities of the elements. But it is possible, depending on the application required, to juxtapose the matrix elements so as to leave voids in the assembly such as for example non-occupied spaces of matrix elements.

By cavity formed in a matrix element is meant here for example a hole, a groove or a slot extending from one side of the element to the other. Each matrix element advantageously comprises cavities oriented in at least four different directions for receiving at least one reinforcing element of each bundle.

The housings formed by the cavities of the juxtaposed matrix elements are preferably continuous, i.e., each housing extends right through from one end of the matrix to the other. Reinforcing elements are inserted through the entire length of these housings or in only part thereof. In this last case, one or more housings contain no reinforcing elements throughout their entire length or through only part thereof. It will be further noted that at least some of these reinforcing elements may be discontinuous, a housing being then occupied by several portions of reinforcing elements placed end-to-end. Preferably, each reinforcing element fits exactly inside the perimeter of the cross-section of each cavity that it occupies.

The present invention relates not only to a method for making a composite structure, but also to a matrix for use in the making of a composite structure and such as obtained by assembling matrix elements as described hereinabove, as well as to a composite structure such as that made according to the method defined hereinabove.

The invention will be more readily understood on reading the following description with reference to the accompanying drawings in which:

FIG. 6 is a partial view of a composite structure comprising a matrix made up of elements such as that illustrated in FIG. 4;

FIG. 7 is a perspective view of a third embodiment of a matrix element according to the invention;

FIG. 8 is a perspective view showing reinforcing elements housed in the grooves provided in the matrix element shown in FIG. 7;

FIG. 9 is a partial view of a composite structure comprising a matrix made up of elements such as that shown in FIG. 7;

Figure 13:
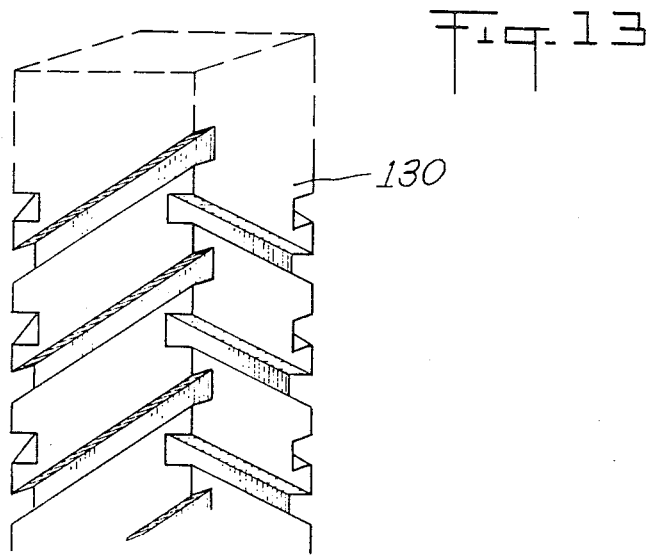
Figure 14:
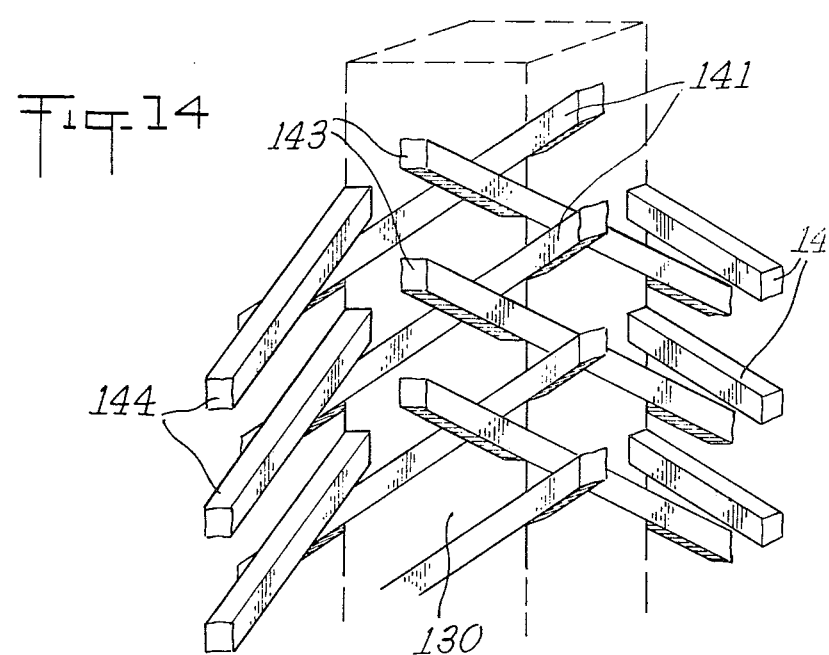

FIGS. 10, 12, and 13 are three perspective views showing variants of embodiment of a matrix element of the type shown in FIG. 7;

FIGS. 11 and 14, are two perspective views showing reinforcing elements housed in the grooves of the matrix elements illustrated in FIGS. 10 and 13 respectively;

FIG. 15 shows in perspective a fourth embodiment of a matrix element according to the invention;

FIG. 16 is a perspective view of the reinforcing elements housed in the grooves and holes of the matrix element shown in FIG. 15; and FIG. 17 is a partial view of a composite structure comprising a matrix made up of elements such as that illustrated in FIG. 15.

The following examples are given to illustrate several embodiments of the composite structure according to the invention.

EXAMPLE 1

Figure 1:
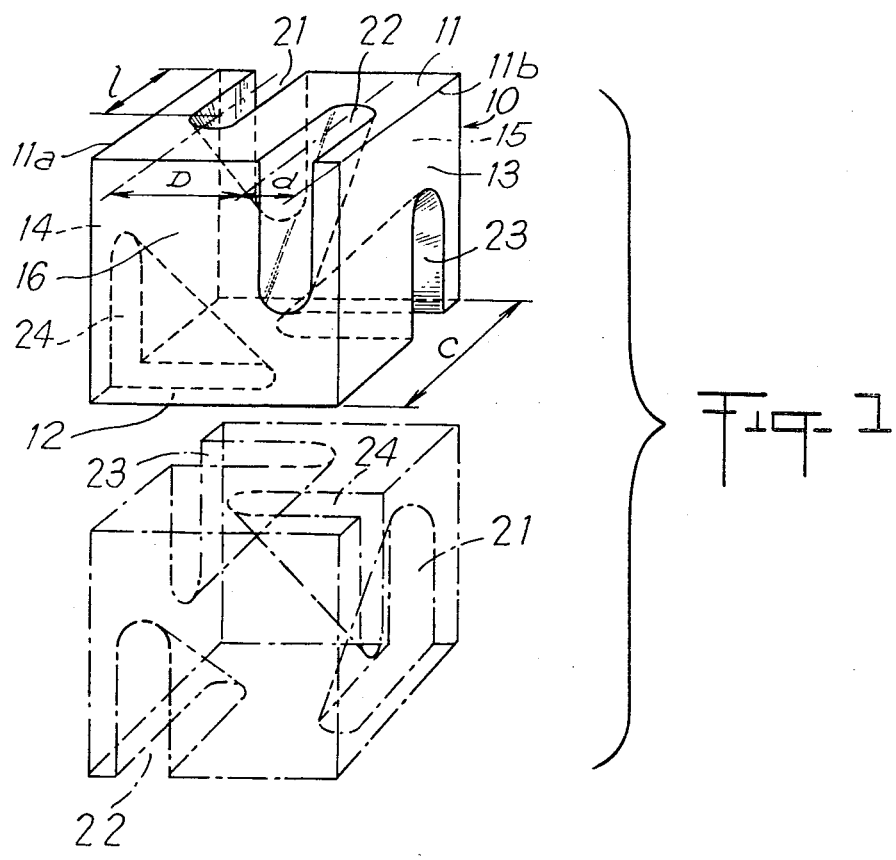
FIG. 1 is a perspective view of a first embodiment of a matrix element for use in the construction of a composite structure according to the invention.
Figure 3:
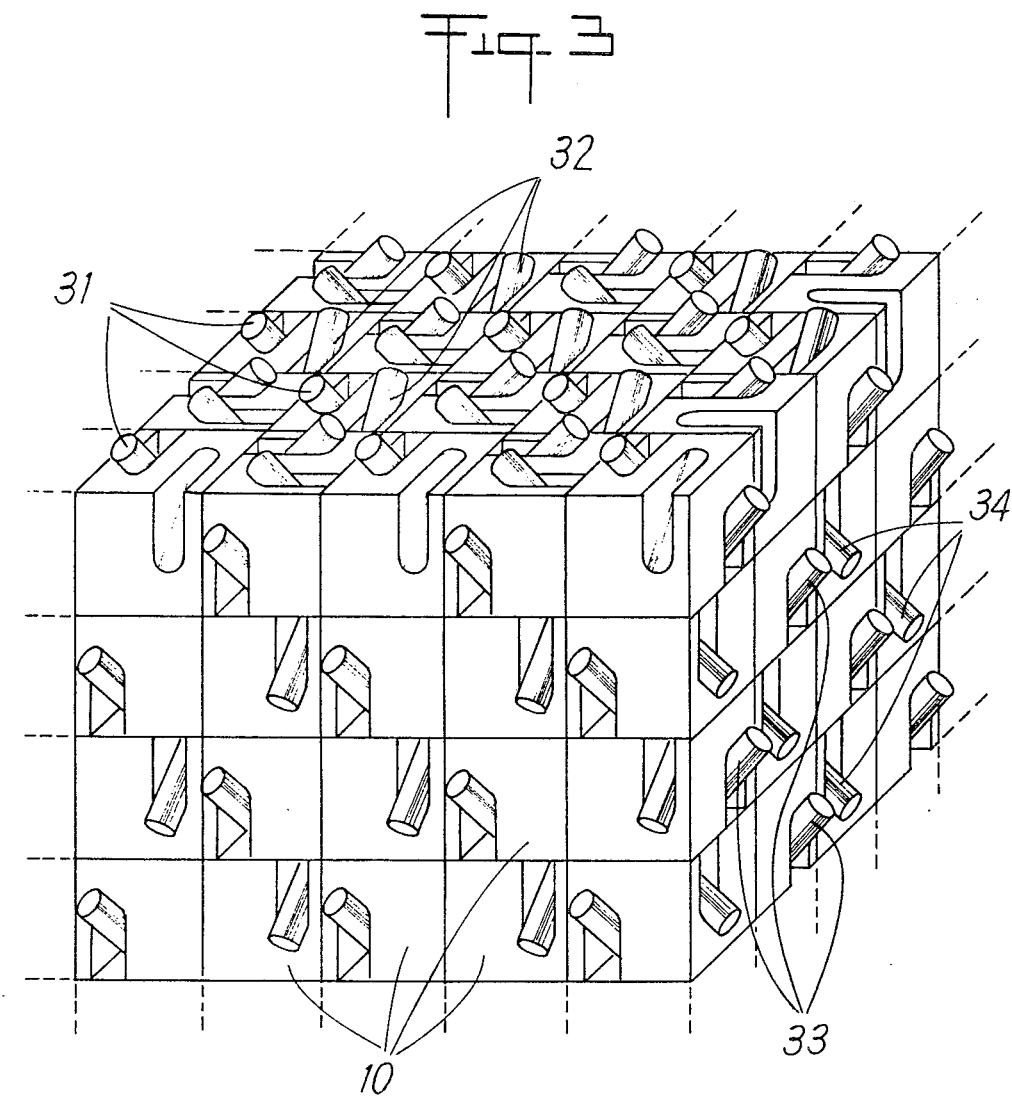
FIG. 3 is a partial view of a composite structure comprising a matrix made from elements such as that illustrated in FIG. 1.

A coherent construction of any size is produced without bond with matrix elements in the form of cube-shaped bricks 10 with sides of 10 cm, each brick comprising four slots such as shown in FIG. 1, said bricks being juxtaposed and bonded together by reinforcing elements shaped as cylindrical rods of 2 cm diameter circular cross-section, as shown in FIG. 3.

Figure 2:
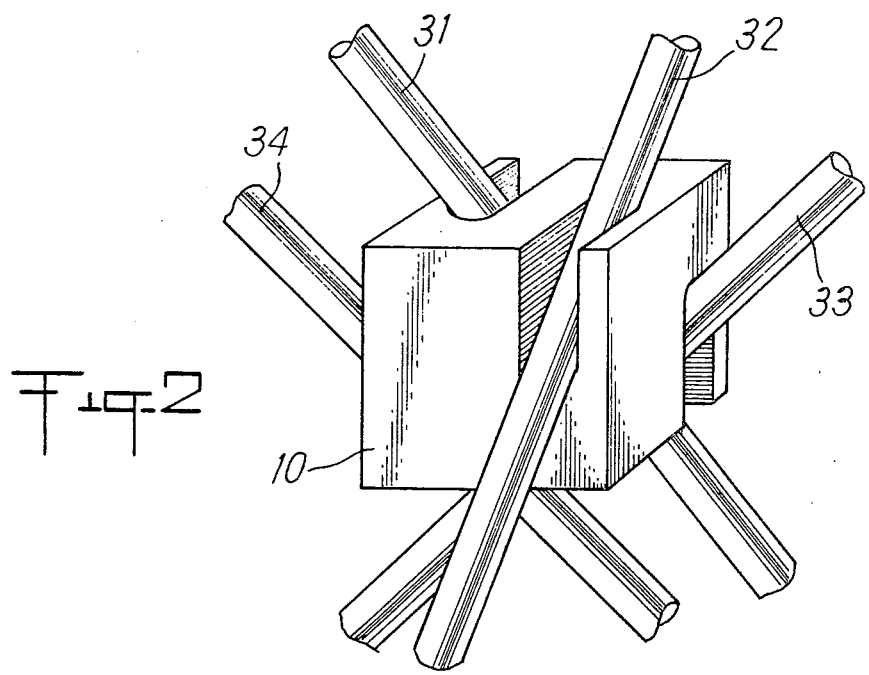
FIG. 2 is a perspective view showing partly four reinforcing elements inserted in the slots provided in the matrix element shown in FIG. 1.

Each brick 10 is provided with four slots 21, 22, 23, 24 designed to receive four reinforcing elements which are respectively parallel to the four diagonals of two adjacent faces of the cube 10, as shown in FIG. 2.

The slots are perpendicular to four edges of the cube, the edge facing an edge traversed by a slot not being traversed by a slot.

Two slots, respectively 21-22, 23-24 issue on each of two opposite faces 11, 12 of the cube 10, but only one slot respectively 23, 24, 21, 22 issues on each respective one of the other faces 13, 14, 15, 16 of the cube.

The slots of one cube are mutually set off so that the reinforcing elements placed inside them do not interfere one with the other. Thus, the slots 21, 22 both of which issue on to face 11 and are parallel to the sides 11a, 11b of said face, have different longitudinal planes of symmetry. The same applies to slots 23, 24 both of which issue onto face 12.

It will be noted that faces 11, 12 of the cube are not identical seeing that if the cube is turned over, the face 12 is not superimposable on the face 11. In effect, the face 11 describes an S whereas the face 12 describes a Z (or N). A cube 10 in the turned over position is shown in chain-dotted lines in FIG. 1.

FIG. 2 shows how four cylindrical rods 31, 32, 33, 34 having different directions are respectively housed in the four slots 21, 22, 23, 24 of a cube 10.

FIG. 3 shows a composite structure made up of stacked and juxtaposed cubes 10 and of cylindrical rods forming four bundles of different directions, the rods of each bundle being parallel and regularly spaced in the whole structure. It will be noted that one rod of each bundle goes through each cube 10.

The cubes 10 are so assembled that two adjacent cubes are in reversed position one with respect to the other. For example, referring to FIG. 1, the orientation of the cube shown in chain-dotted lines is obtained by simply turning over the cube shown in block lines above it, about an axis which is perpendicular either to faces 13 and 14 or to faces 15 and 16. The slots of the stacked cubes define passages for inserting cylindrical rods, each passage being made up by slots extending one from the other.

To this effect, the width of each slot is at least and preferably equal to the diameter of a cylindrical rod. Moreover, the longitudinal median plane of a slot is situated at a distance d from the nearest parallel face of the cube, the value of which is the same for all the slots. Said distance d is preferably equal to half the distance D separating the longitudinal median planes of slots 21, 22 or 23, 24. The distance d is then equal to a quarter of the length of the edges of the cube. Thus, the cylindrical rods 31, 32 form equidistant and alternated parallel layers, and so do the cylindrical rods 33, 34. Finally, the length 1 of the openings of the slots on the faces of the cube 10, measured from the edge which they traverse to the axis of their semi-cylindrical base is at least equal to half the length c of the edges of the cube. The slots of the juxtaposed cubes thus form adequate passages for the cylindrical rods. When choosing $l = c/2$, the exact passage necessary for the cylindrical rods is obtained. Said rods are then housed exactly at the base of the slots and are in contact over their entire length with bricks 10 placed alternately on either side of the same longitudinal plane of symmetry. The rods 31, 32, 33, 34 thus lock the stacked bricks 10 together, in bolted manner.

A coherent composite structure is thus obtained without having to use a bond, in which structure the matrix is constituted by the stacked bricks 10, the reinforcement being of the 4D type, i.e. made up of reinforcing elements forming four bundles of different orientation (4D), the elements in each bundle being parallel and regularly spaced apart. In FIG. 3, the four bundles are formed respectively by the rods 31, the rods 32, the rods 33 and the rods 34.

The bricks 10 may be produced by direct molding. A typical application of this kind of construction is the production of furnaces, or of hot chambers in general, using fireproof bricks assembled together by likewise fireproof bars.

EXAMPLE 2

A metal/metal type of composite material is obtained by closely bonding a multi-directional reinforcement structure made from a metal showing high mechanical properties to a matrix in ductile metal. The matrix is made up of perforated bars in ductile metal and the reinforcement structure is made up of four bundles of cylindrical rods in a metal showing high mechanical properties.

Figure 4:
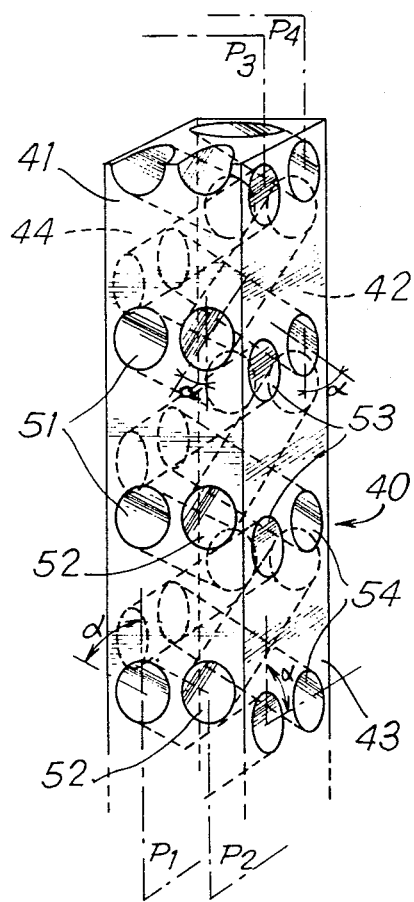
FIG. 4 is a perspective view of a second embodiment of a matrix element according to the invention.

A bar 40 is shown in FIG. 4. It is constituted by a prism of 5 mm-square cross-section for example. The prism is provided with holes to receive without play four sets of cylindrical rods of 2 mm diameter for example.

Figure 5:
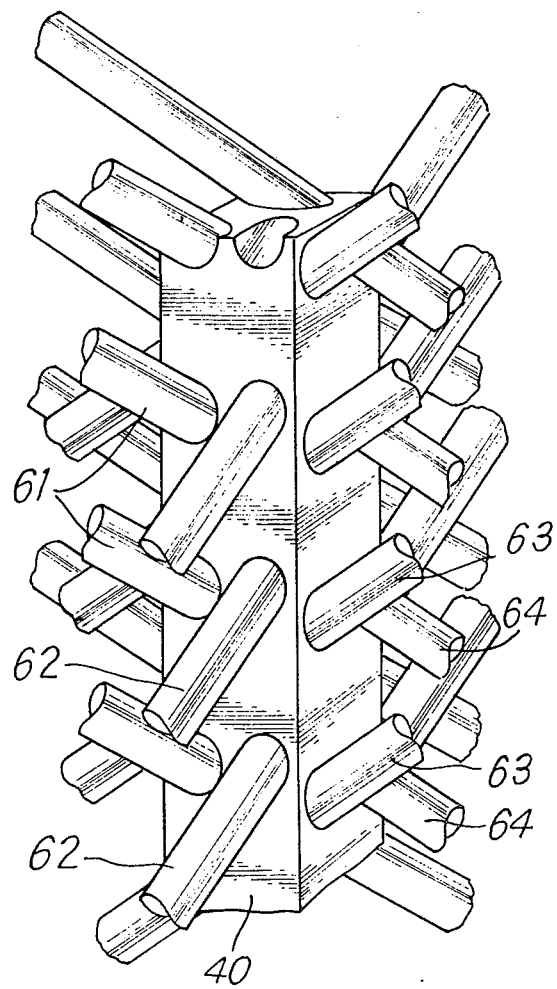
FIG. 5 is a perspective view showing reinforcing elements inserted in the holes provided in the matrix elements shown in FIG. 4.

As can be seen in FIGS. 4 and 5, two sets of holes 51, 52 traverse through the bar 40 issuing on two opposite faces 41, 42 thereof. The axes of the holes 51 are in the same plane P1 parallel to the other faces 43, 44 of the bar and form with the face 41 the same angle α different from 90°. The axes of the holes 52 are in another plane P2 parallel to the faces 43, 44 and likewise form with the face 41 an angle α, but the directions of the axes of the holes 51 and 52 are symmetrical together with respect to a line perpendicular to faces 41, 42.

In the same way, two series of holes 53, 54 traverse through the bar 40, issuing on faces 43, 44. The axis of the holes 53 and 54 are contained in two planes P3, P4 parallel to faces 41, 42 forming with the face 43, angles α different from 90°, the axes of the holes 53 and 54 being symmetrical together with respect to a line perpendicular to faces 43, 44. The inclination of the axes of the different holes with respect to the faces on to which they issue is for example 55°, the axes of the holes in each set of holes being equidistant, with for example a pitch p of 7 mm in the longitudinal direction of the bar.

FIG. 5 shows four sets of cylindrical rods 61, 62, 63, 64 inserted in the holes 51, 52, 53, 54.

A composite structure is built by juxtaposing identical bars 40, two adjacent bars being set off lengthwise, by a distance equal to half the pitch p between holes of a same set of holes (FIG. 6). Thus, the holes issuing on the contacting faces of the juxtaposed bars are situated in extension one from the other and constitute housings for the four bundles of cylindrical rods which completely lock the building together. The cylindrical rods in each bundle are regularly spaced.

Each one of planes P1, P2, P3, P4 of the axes of holes 51, 52, 53 54 is preferably at a distance from the nearest face of the bar parallel thereto, which is equal to a quarter of the width of the side of the bar. Thus, the bundles formed by the rods 61, 62 are constituted of equidistant and parallel alternate sets of rods, and so are the bundles formed by the rods 63, 64.

The resulting composite structure has a matrix in ductile metal made from a juxtaposition of bars 40 and a reinforcing 4D structure in a metal showing high mechanical properties, formed by cylindrical rods 61, 62, 63, 64.

The cohesion of this assembly can be improved by a compaction operation the effect of which is to finish off the contacts between matrix and reinforcement, on the one hand, and between the elements of matrix on the other hand. Depending on the nature of the materials used, on their responsiveness to heat treatments, on their respective coefficient of expansion, or their affinity, etc . . . compaction is possible using a press, or the isostatic method or any other known means in hot or cold conditions.

EXAMPLE 3

This example relates to the making of a carbon-carbon composite structure by closely associating a multidirectional reinforcing structure containing carbon fibers to a matrix entirely made of carbon.

The matrix elements are grooved bars 70 in graphite such as illustrated in FIG. 7. The reinforcing elements are cylindrical bars with circular cross-section made of carbon fibers solidly bonded together by a polymerized resin, carbonized either before or after the construction of the composition structure.

Each bar 70 is prismatic, with a cross-section which is contained inside a 15 mm-square, for example. Each face 71, 72, 73, 74 of the bar is provided with a set of grooves 81, 82, 83, 84 respectively. The grooves in each set of grooves are parallel together and form with the longitudinal direction of a bar an oblique angle $\beta$. Said angle is the same for all four sets of grooves and equal to about 56°19' (angle having a tangent equal to 3/2). The grooves in each set of grooves are placed at regular intervals along the bar with a pitch of 10 mm. As clearly shown in FIG. 7, and assuming that the bar is placed vertically, the grooves of two adjacent faces of the bar are all directed upwards or downwards from the edge separating said two faces. Each edge is cut alternately and at regular intervals (5 mm) by the groove of a face adjacent to said edge and by the groove of the other face adjacent to said edge. For the sake of clarity, the edges of the bar 70 which correspond to the edges of the prism with square cross-section described around the bar have not been shown in FIGS. 7 and 8. Each edge being cut into by the grooves of the two faces which it separates, some parts of it are thinner as a result, and if they become too delicate, they could break easily when the structure is built and thereafter interfere with the insertion of the reinforcing elements. Therefore, it will be advantageous to remove these thin parts after grooving (by fettling) or to groove a bar on which the edges have been removed, such as shown in FIG. 7.

The grooves have 3 mm-square cross-sections and are obtained by milling. Said grooves are milled on the four faces of the bar in such a way that the reinforcing rods of 3 mm diameter inserted in said grooves, intersect without touching.

FIG. 8 shows four families of rods 91, 92, 93, 94 respectively housed in four sets of grooves 81, 82, 83, 84.

The composite structure is built by regularly juxtaposing the bars so that the grooves of the successive bars extend one from the other (FIG. 9). Passages are thus defined for the reinforcing rods which will ensure the complete locking of the building and form a multidirectional reinforcement structure of the 4D type. Each bundle is made up of regularly spaced parallel reinforcing elements.

A good quality composite material is obtained by subjecting the composite structure so obtained to further treatments meant for example to carbonize the resin used to bond the fibers constituting the reinforcing elements, or meant to bond together all the matrix elements and reinforcing elements which are only assembled and to fill in the voids between same and in particular the voids between the square grooves and the cylindrical rods. These additional treatments consist for example in introducing a material in fluid or even powder form. This can be done by a known method of densification.

EXAMPLE 4

This example is concerned with the production of a carbon-carbon composite material which comprises, as in Example 3, a 4D multidirectional reinforcement structure made up of four bundles of reinforcing elements and of a carbon matrix.

The matrix elements are grooved bars 100 in graphite such as shown in FIG. 10. The reinforcing elements are circular rods of circular cross-section such as used in Example 3.

Each bar 100 is prismatic, with a 15 mm-square cross-section. Each face 101, 102, 103, 104 of the bar is provided with a set of grooves 111, 112, 113, 114, respectively. The grooves in each set of grooves are parallel together and form with the longitudinal direction of the bar the same oblique angle $\alpha$ equal to about 56°19'. The grooves in each set of grooves are regularly spaced with a pitch of 10 mm.

Contrary to the case presented in Example 3, the bar 100 being vertical, the grooves of two adjacent faces are respectively directed upwards for one face and downwards for the other, from the edge common to said two faces.

Another difference between the grooves of the bar 100 and those of the bar 70 is that the first ones have a U-shaped cross-section with a semi-circular base of 1.5 mm radius, the total depth of the grooves being 3 mm. In the present case, the shape of the grooves is adapted to that of the reinforcing elements which they are designed to receive.

FIG. 11 shows four families of rods 121, 122, 123, 124, respectively housed in the four sets of grooves 111, 112, 113, 114. It will be noted that here, as in all the other examples, the cross-sections of the reinforcing elements are entirely contained in the cavities formed in the matrix elements.

A composite structure is built by regularly juxtaposing the bars in such a way that the grooves of successive bars extend one from the other. This composite structure can likewise be subjected to further treatments such as those indicated in Example 3.

It is noted from FIG. 10 that the grooves of two adjacent faces are separated one from the other, along each edge, by thin "horn-shaped" portions 105. When these parts are fragile to the point of breaking up and of possibly interfering with the insertion of the reinforcing elements, it is advisable to remove them. A trimmed bar 100' is then obtained, such as that illustrated in FIG. 12. Said bar 100' can be used exactly like the bar 100.

EXAMPLE 5

This example differs from Example 3 in that, first, the grooves made in each prismatic bar 130 (FIG. 13) have a 2 mm-square cross-section and, second, the reinforcing elements are rods of 2 mm-square cross-section, and not of circular cross-section. Said rods 141, 142, 143, 144 are shown in FIG. 14.

It will be noted that the composite structure built by juxtaposing the bars 130 in such a way that the grooves of successive bars extend one from the other, and by inserting rods in all the cavities formed by said grooves, has no voids between the matrix elements and the reinforcing elements.

EXAMPLE 6

This example is concerned with a carbon-carbon composite material comprising a 6D multi-directional reinforcement structure made up of six bundles of reinforcing elements and of a carbon matrix.

The matrix elements are bars 150 (FIG. 15) similar in dimensions to the bars 70 described in Example 3 and comprising on their faces 151, 152, 153, 154, grooves 161, 162, 163, 164 of similar shape, dimensions and disposition as the grooves 81, 82, 83, 84. As a variant, the grooves 161, 162, 163, 164, whilst retaining the same orientations on the different faces of the bar as the grooves 81, 82, 83, 84, could have a U-shaped cross-section, identical to the cross-section of the grooves of bar 100 of FIG. 10.

The bar 150 differs from the bar 70 in that it comprises two sets of holes 155, 156 (FIG. 15). The axes of the holes 155 are situated in the median plane of the bar which is parallel to the faces 153, 154 and they are perpendicular to the faces 151, 152; the holes 155 are regularly distributed along the bar, one between two consecutive grooves 161 or 162. In like manner, the axes of the holes 156 are situated in the median plane of the bar which is parallel to the faces 151, 152, and they are perpendicular to the faces 153, 154; the holes 156 are distributed regularly along the bar, one between two consecutive grooves 163 or 164.

The holes 155, 156 have a diameter of 3 mm to receive respectively cylindrical rods 175, 176 of circular cross-section of 3 mm. Said rods are identical to rods 171, 172, 173, 174 fitted in the grooves 161, 162, 163, 164 (FIG. 16) in the same way as the rods 91, 92, 93, 94 are fitted in the grooves 81, 82, 83, 84.

The composite structure is built by juxtaposing the bars 150 in such a way that the holes 155 are aligned, as well as the holes 156 (FIG. 17). The rods 171 to 176 having then been fitted in, six bundles of reinforcing elements are obtained, two of which are oriented perpendicularly one to the other. In the bundles formed by the rods 155, 156, as in the other bundles, the reinforcing elements are regularly spaced.

It will be noted on this point that in all the preceding examples, each bundle of reinforcing elements is constituted of parallel and regularly spaced elements.

The composite structure obtained according to Example 6 can be densified by further treatments such as described in Example 3.

The invention is in no way limited to the description and examples given hereinabove and on the contrary covers any modifications or additions that can be made thereto without departing from its scope.

What is claimed is:

1. A composite structure comprising:
rectilinear reinforcing elements forming at least four different bundles, each bundle consisting of a plurality of reinforcing elements parallel to a particular direction and distributed in the whole volume of the structure, the directions of the different bundles being different from each other and not being all parallel to a same plane, and a matrix filling at least a major part of the volume of the structure between the reinforcing elements, wherein said matrix comprises solid, prefabricated matrix elements of prismatic form and each provided with grooves, each opening on one face of the matrix element and extending from one edge to an opposite one of said faces, said matrix elements being juxtaposed so as to form with said grooves at least four groups of rectilinear housings, each group consisting in a plurality of housings parallel to a same respective one of said directions and distributed in the whole volume occupied by the juxtaposed matrix elements; and said reinforcing elements are arranged in at least a part of the housings of each group, whereby a coherent composite structure is provided with said reinforcing elements performing a locking of the assembled matrix elements.

2. A composite structure as claimed in claim 1, wherein the assembly of matrix elements and reinforcing elements is compacted.

3. A composite structure as claimed in claim 1, and further comprising a material introduced in voids between the reinforcing and matrix elements.

4. A composite structure as claimed in claim 1, wherein the reinforcing elements occupying the grooves of each matrix element comprise at least one reinforcing element of each bundle.

5. A composite structure as claimed in claim 1, wherein the matrix elements are all identical.

6. A composite structure as claimed in claim 1, wherein each reinforcing element has a cross-section which is contained inside the perimeter of the cross-section of each groove inside which the reinforcing element is housed.

7. A composite structure as claimed in claim 1, wherein each matrix element has four lateral faces, each showing a plurality of parallelly-extending grooves, the directions of the grooves on the faces of the matrix element being different from each other.

* * * * *